United States Patent
Ahn et al.

(10) Patent No.: US 12,404,692 B2
(45) Date of Patent: Sep. 2, 2025

(54) SYSTEM AND METHOD FOR DEPLOYING A VEHICLE AWNING

(71) Applicant: GM Global Technology Operations LLC, Detroit, MI (US)

(72) Inventors: Ki Hyun Ahn, Lake Orion, MI (US); Joseph F. Szczerba, Grand Blanc, MI (US); Bobin Kil, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 361 days.

(21) Appl. No.: 18/171,990

(22) Filed: Feb. 21, 2023

(65) Prior Publication Data
US 2024/0279957 A1 Aug. 22, 2024

(51) Int. Cl.
*B60J 3/00* (2006.01)
*E04H 15/08* (2006.01)

(52) U.S. Cl.
CPC .............. *E04H 15/08* (2013.01); *B60J 3/002* (2013.01)

(58) Field of Classification Search
CPC .. E04H 15/08; B60J 3/002; B60J 3/005; B60J 11/04; B60J 11/02; B60J 11/025; B60J 11/06; E06B 9/68; E06B 2209/6809; E06B 2009/6818; E06B 2009/6827; E04F 10/06; E04F 10/02
See application file for complete search history.

(56) References Cited

U.S. PATENT DOCUMENTS

| | | | | |
|---|---|---|---|---|
| 7,562,928 | B1 * | 7/2009 | Morazan | B60J 11/00 296/136.12 |
| 10,421,344 | B2 * | 9/2019 | Ghannam | B60J 1/2094 |
| 11,982,095 | B1 * | 5/2024 | Wolf | E04H 15/06 |
| 2016/0338457 | A1 * | 11/2016 | Gharabegian | G01J 1/42 |
| 2017/0324896 | A1 * | 11/2017 | Gharabegian | A45B 17/00 |
| 2018/0099545 | A1 * | 4/2018 | Prokhorov | B60J 3/002 |
| 2021/0002943 | A1 * | 1/2021 | Urano | E05F 15/73 |
| 2024/0217316 | A1 * | 7/2024 | Stevenson | B60J 11/04 |

FOREIGN PATENT DOCUMENTS

| | | | | |
|---|---|---|---|---|
| CN | 110572119 A | * | 12/2019 | B60J 11/04 |
| KR | 101472928 B1 | * | 12/2014 | B60J 5/0494 |
| KR | 102043832 B1 | * | 11/2019 | |

OTHER PUBLICATIONS

Machine translation KR102043832 (Year: 2019).*
Machine translation CN110572119 (Year: 2019).*
Machine translation KR101472928 (Year: 2014).*

* cited by examiner

*Primary Examiner* — Daniel P Cahn
*Assistant Examiner* — Jeremy C Ramsey
(74) *Attorney, Agent, or Firm* — Vivacqua Crane, PLLC

(57) ABSTRACT

An awning system for a vehicle includes at least one vehicle sensor, a vehicle awning, and a controller in electrical communication with the at least one vehicle sensor and the vehicle awning. The controller is programmed to identify at least one deployment criterion using the at least one vehicle sensor. The controller is further programmed to determine at least one deployment parameter based at least in part on the at least one deployment criterion The controller is further programmed to deploy the vehicle awning based at least in part on the at least one deployment parameter in response to identifying the at least one deployment criterion.

18 Claims, 3 Drawing Sheets

SYSTEM AND METHOD FOR DEPLOYING A VEHICLE AWNING

INTRODUCTION

The present disclosure relates to systems and methods for increasing occupant comfort for a vehicle, and more specifically, to systems and method for deploying an awning for a vehicle.

To increase occupant comfort and convenience, vehicles may be equipped with comfort and convenience systems such as heating, ventilation, and air conditioning (HVAC) systems. HVAC systems allow the occupant to control a temperature of a cabin of the vehicle to increase comfort. Additionally, vehicles may be equipped with remote start systems. Remote start systems may allow occupants to start the vehicle remotely, thus allowing the vehicle to warm up and defrost in inclement weather conditions. Additionally, vehicles may be equipped with roof gutters to guide precipitation (e.g., rainwater) away from doors and windows of the vehicle, increasing occupant comfort when entering and exiting the vehicle. However, current systems for increasing occupant comfort may not protect occupants from inclement weather, such as rain, when entering the vehicle, especially when carrying multiple items.

Thus, while current occupant comfort systems and methods achieve their intended purpose, there is a need for a new and improved system and method for increasing occupant comfort for a vehicle.

SUMMARY

According to several aspects, an awning system for a vehicle is provided. The awning system also includes at least one vehicle sensor, a vehicle awning, and a controller in electrical communication with the at least one vehicle sensor and the vehicle awning. The controller is programmed to identify at least one deployment criterion using the at least one vehicle sensor. The controller is further programmed to determine at least one deployment parameter based at least in part on the at least one deployment criterion The controller is further programmed to deploy the vehicle awning based at least in part on the at least one deployment parameter in response to identifying the at least one deployment criterion.

In another aspect of the present disclosure, to identify the at least one deployment criterion, the controller is further programmed to determine a weather condition in an environment surrounding the vehicle using the at least one vehicle sensor. To identify the at least one deployment criterion, the controller is further programmed to determine an occupant location relative to the vehicle using the at least one vehicle sensor. To identify the at least one deployment criterion, the controller is further programmed to determine a vehicle parking state using the at least one vehicle sensor. The vehicle parking state includes a vehicle parked state and a vehicle non-parked state. To identify the at least one deployment criterion, the controller is further programmed to identify the at least one deployment criterion based at least in part on the weather condition, the occupant location, and the vehicle parking state.

In another aspect of the present disclosure, to identify the at least one deployment criterion, the controller is further programmed to identify the at least one deployment criterion in response to determining that the weather condition is a precipitation condition, the occupant location is within a predetermined proximity threshold to the vehicle, and the vehicle parking state is the vehicle parked state.

In another aspect of the present disclosure, the at least one vehicle sensor further includes a global navigation satellite system (GNSS). To determine the vehicle parking state, the controller is further programmed to determine a location of the vehicle using the GNSS. To determine the vehicle parking state, the controller is further programmed to determine a gear selector state of a gear selector of the vehicle. The gear selector state includes a parking selected state and non-parking selected state. To determine the vehicle parking state, the controller is further programmed to determine the vehicle parking state based at least in part on the location of the vehicle and the gear selector state.

In another aspect of the present disclosure, the at least one vehicle sensor further includes a vehicle communication system. To identify the at least one deployment criterion, the controller is further programmed to receive a deployment signal using the vehicle communication system. To identify the at least one deployment criterion, the controller is further programmed to identify the at least one deployment criterion in response to receiving the deployment signal.

In another aspect of the present disclosure, to identify the at least one deployment criterion, the controller is further programmed to determine a predicted door utilization of the vehicle using the at least one vehicle sensor. The predicted door utilization includes at least one door of the vehicle. To identify the at least one deployment criterion, the controller is further programmed to identify the at least one deployment criterion in response to determining that a coverage area of the vehicle awning includes at least one door of the predicted door utilization.

In another aspect of the present disclosure, the at least one vehicle sensor further includes a perception sensor. To determine the predicted door utilization, the controller is further programmed to perform at least one perception measurement using the perception sensor. To determine the predicted door utilization, the controller is further programmed to determine a predicted path of an occupant approaching the vehicle based at least in part on the at least one perception measurement. To determine the predicted door utilization, the controller is further programmed to identify a cargo load of the occupant based at least in part on the at least one perception measurement. To determine the predicted door utilization, the controller is further programmed to determine the predicted door utilization based at least in part on the predicted path and the cargo load.

In another aspect of the present disclosure, the at least one vehicle sensor further includes a ranging sensor. To determine the at least one deployment parameter, the controller is further programmed to determine a desired awning deployment distance based at least in part on the at least one deployment criterion. To determine the at least one deployment parameter, the controller is further programmed to determine a maximum awning deployment distance. Determining the maximum awning deployment distance includes performing a distance measurement between the vehicle awning and an obstacle in an environment surrounding the vehicle using the ranging sensor. To determine the at least one deployment parameter, the controller is further programmed to determine an awning deployment distance based on the desired awning deployment distance and the maximum awning deployment distance. The awning deployment distance is equal to a lesser of the desired awning deployment distance and the maximum awning deployment distance.

In another aspect of the present disclosure, to determine the at least one deployment parameter, the controller is further programmed to determine a light level of an environment surrounding the vehicle using the at least one vehicle sensor. To determine the at least one deployment parameter, the controller is further programmed to compare the light level to a predetermined light level threshold. To determine the at least one deployment parameter, the controller is further programmed to determine a vehicle awning light source activation state to be a light source active state in response to determining that the light level is less than or equal to the predetermined light level threshold.

In another aspect of the present disclosure, the vehicle awning further includes a vehicle awning light source. To deploy the vehicle awning, the controller is further programmed to deploy the vehicle awning to the awning deployment distance in response to identifying the at least one deployment criterion. To deploy the vehicle awning, the controller is further programmed to enable the vehicle awning light source in response to determining that the vehicle awning light source activation state is the light source active state.

According to several aspects, a method for deploying a vehicle awning is provided. The method includes identifying at least one deployment criterion using at least one vehicle sensor. The method also includes determining at least one deployment parameter based at least in part on the at least one deployment criterion. The method also includes deploying the vehicle awning based at least in part on the at least one deployment parameter in response to identifying the at least one deployment criterion.

In another aspect of the present disclosure, identifying the at least one deployment criterion further may include determining a weather condition in an environment surrounding the vehicle using the at least one vehicle sensor. Identifying the at least one deployment criterion further may include determining an occupant location relative to the vehicle using the at least one vehicle sensor. Identifying the at least one deployment criterion further may include determining a vehicle parking state using the at least one vehicle sensor. The vehicle parking state includes a vehicle parked state and a vehicle non-parked state. Identifying the at least one deployment criterion further may include identifying the at least one deployment criterion in response to determining that the weather condition is a precipitation condition, the occupant location is within a predetermined proximity threshold to the vehicle, and the vehicle parking state is the vehicle parked state.

In another aspect of the present disclosure, determining the vehicle parking state further may include determining a location of the vehicle using a global navigation satellite system (GNSS). Determining the vehicle parking state further may include determining a gear selector state of a gear selector of the vehicle. The gear selector state includes a parking selected state and non-parking selected state. Determining the vehicle parking state further may include determining the vehicle parking state based at least in part on the location of the vehicle and the gear selector state.

In another aspect of the present disclosure, identifying the at least one deployment criterion further may include receiving a deployment signal using a vehicle communication system. Identifying the at least one deployment criterion further may include identifying the at least one deployment criterion in response to receiving the deployment signal.

In another aspect of the present disclosure, identifying the at least one deployment criterion further may include performing at least one perception measurement using a perception sensor. Identifying the at least one deployment criterion further may include determining a predicted path of an occupant approaching the vehicle based at least in part on the at least one perception measurement. Identifying the at least one deployment criterion further may include identifying a cargo load of the occupant based at least in part on the at least one perception measurement. Identifying the at least one deployment criterion further may include determining a predicted door utilization of the vehicle based at least in part on the predicted path and the cargo load. The predicted door utilization includes at least one door of the vehicle. Identifying the at least one deployment criterion further may include identifying the at least one deployment criterion in response to determining that a coverage area of the vehicle awning includes at least one door of the predicted door utilization.

In another aspect of the present disclosure, determining the at least one deployment parameter further may include determining a desired awning deployment distance based at least in part on the at least one deployment criterion. Determining the at least one deployment parameter further may include determining a maximum awning deployment distance. Determining the maximum awning deployment distance includes performing a distance measurement between the vehicle awning and an obstacle in an environment surrounding the vehicle using a ranging sensor. Determining the at least one deployment parameter further may include determining an awning deployment distance based on the desired awning deployment distance and the maximum awning deployment distance. The awning deployment distance is equal to a lesser of the desired awning deployment distance and the maximum awning deployment distance.

In another aspect of the present disclosure, deploying the vehicle awning further may include deploying the vehicle awning to the awning deployment distance in response to identifying the at least one deployment criterion.

According to several aspects, an awning system for a vehicle includes at least one vehicle sensor. The at least one vehicle sensor may include a global navigation satellite system (GNSS). The at least one vehicle sensor may further include a vehicle communication system. The at least one vehicle sensor may further include a perception sensor and a ranging sensor. The system also includes a vehicle awning. The vehicle awning may further include a vehicle awning light source. The system also includes a controller in electrical communication with the at least one vehicle sensor and the vehicle awning. The controller is programmed to determine a weather condition in an environment surrounding the vehicle using the at least one vehicle sensor. The controller is further programmed to determine an occupant location relative to the vehicle using the at least one vehicle sensor. The controller is further programmed to determine a location of the vehicle using the GNSS. The controller is further programmed to determine a gear selector state of a gear selector of the vehicle. The gear selector state includes a parking selected state and non-parking selected state. The controller is further programmed to determine a vehicle parking state based at least in part on the location of the vehicle and the gear selector state. The controller is further programmed to identify at least one deployment criterion in response to determining that the weather condition is a precipitation condition, the occupant location is within a predetermined proximity threshold to the vehicle, and the vehicle parking state is the vehicle parked state. The controller is further programmed to perform at least one perception measurement using the perception sensor. The controller is further programmed to determine a predicted path of an occupant approaching the vehicle based at least in part on the at least one perception measurement. The controller is further programmed to identify a cargo load of the occupant based at least in part on the at least one perception measurement. The controller is further programmed to determine a predicted door utilization based at least in part on the predicted path and the cargo load. The controller is further programmed to deploy the vehicle awning based at least in part on the predicted door utilization.

In another aspect of the present disclosure, the controller is further programmed to determine a desired awning deployment distance based at least in part on the at least one deployment criterion. The controller is further programmed to determine a maximum awning deployment distance. Determining the maximum awning deployment distance includes performing a distance measurement between the vehicle awning and an obstacle in an environment surrounding the vehicle using the ranging sensor. The controller is further programmed to determine an awning deployment distance based on the desired awning deployment distance and the maximum awning deployment distance. The awning deployment distance is equal to a lesser of the desired awning deployment distance and the maximum awning deployment distance. The controller is further programmed to deploy the vehicle awning based at least in part on the predicted door utilization and the awning deployment distance.

In another aspect of the present disclosure, the controller is further programmed to determine a light level of an environment surrounding the vehicle using the at least one vehicle sensor. The controller is further programmed to compare the light level to a predetermined light level threshold. The controller is further programmed to enable the vehicle awning light source in response to determining that the light level is less than or equal to the predetermined light level threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Occupants may often need to enter or exit a vehicle during inclement weather conditions (e.g., rain, sleet, hail, snow, etc.). Additionally, occupants may often use the vehicle to transport multiple additional occupants (i.e., passengers) and/or cargo (e.g., strollers, shopping bags, sports bags, and the like). Therefore, occupants may need to remain outside of the vehicle to load passengers and/or cargo into the vehicle, thus being exposed to the inclement weather conditions. The present disclosure provides a system and method for dynamically deploying a vehicle awning to increase occupant comfort when entering and exiting the vehicle.

Figure 1:
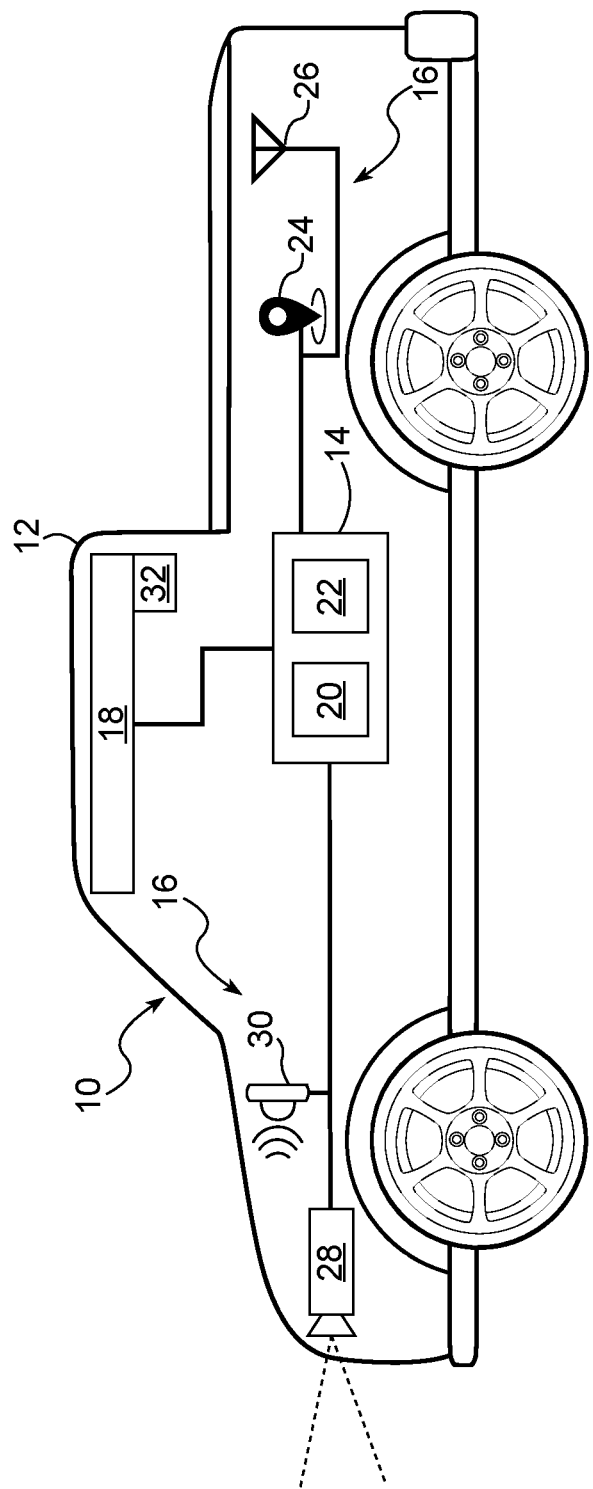
FIG. 1 is a schematic diagram of an awning system for a vehicle, according to an exemplary embodiment.

Referring to FIG. 1, an awning system for a vehicle is illustrated and generally indicated by reference number 10. The system 10 is shown with an exemplary vehicle 12. While a utility vehicle is illustrated, it should be appreciated that the vehicle 12 may be any type of vehicle without departing from the scope of the present disclosure. The system 10 generally includes a controller 14, a plurality of vehicle sensors 16, and a vehicle awning 18.

The controller 14 is used to implement a method 100 for deploying a vehicle awning, as will be described below. The controller 14 includes at least one processor 20 and a non-transitory computer readable storage device or media 22. The processor 20 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 22 may include volatile and nonvolatile storage in read-only memory (ROM), random-access memory (RAM), and keep-alive memory (KAM), for example. KAM is a persistent or non-volatile memory that may be used to store various operating variables while the processor 20 is powered down. The computer-readable storage device or media 22 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16 and the vehicle awning 18. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The plurality of vehicle sensors 16 are used to gather information about an environment surrounding the vehicle 12. In an exemplary embodiment, the plurality of vehicle sensors 16 includes a global navigation satellite system (GNSS) 24, a vehicle communication system 26, a perception sensor (e.g., a surround view camera system 28), and a ranging sensor (e.g., an ultrasonic ranging sensor 30). It should be understood that additional sensors of the vehicle 12, including, for example, wheel speed sensors, engine oil pressure sensors, sun load sensors, light sensors, rain sensors, vehicle occupancy sensors, and the like are within the scope of the present disclosure. The plurality of vehicle sensors 16 are in electrical communication with the controller 14 as described above.

The GNSS 24 is used to determine a geographical location of the vehicle 12. In an exemplary embodiment, the GNSS 24 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 24 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 24. It should be understood that various additional types of satellite-based radionavigation systems, such as, for example, the Global Positioning System (GPS), Galileo, GLONASS, and the BeiDou Navigation Satellite System (BDS) are within the scope of the present disclosure. The GNSS 24 is in electrical communication with the controller 14 as described above.

The vehicle communication system 26 is used by the controller 14 to communicate with other systems external to the vehicle 12. For example, the vehicle communication system 26 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 26 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the $3^{rd}$ Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 26 may include one or more antennas and/or communication transceivers for receiving and/or transmitting signals, such as cooperative sensing messages (CSMs). The vehicle communication system 26 is configured to wirelessly communicate information between the vehicle 12 and another vehicle. Further, the vehicle communication system 26 is configured to wirelessly communicate information between the vehicle 12 and infrastructure or other vehicles. The vehicle communication system 26 is in electrical communication with the controller 14 as described above.

The surround view camera system 28 is used to capture images and/or videos of the environment surrounding the vehicle 12. The surround view camera system 28 includes a plurality of cameras (also known as satellite cameras) arranged to provide a view of the environment adjacent to all sides of the vehicle 12. In a non-limiting example, the surround view camera system 28 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the surround view camera system 28 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

It should be understood that additional perception sensors (i.e., sensors configured to detect and measure objects in the environment surrounding the vehicle), such as, for example, a LiDAR sensor, a radar sensor, and/or the like are within the scope of the present disclosure. The surround view camera system 28 is in electrical communication with the controller 14 as described above.

The ultrasonic ranging sensor 30 is used to measure a distance between the vehicle 12 and an object in an environment surrounding the vehicle 12. In an exemplary embodiment, the ultrasonic ranging sensor 30 works by emitting high-frequency sound waves and measuring a reflection of the high-frequency sound waves off to determine the distance of objects in close proximity to the vehicle. Use of alternative and/or additional ranging sensors, such as, for example, radar sensors, time-of-flight sensors, LiDAR sensors and/or cameras is within the scope of the present disclosure. The ultrasonic ranging sensor 30 is in electrical communication with the controller 14 as described above.

The vehicle awning 18 is used to provide protection from environmental conditions (e.g., sun, precipitation, and the like) to the occupant, the vehicle 12, and or cargo in the vehicle 12. In an exemplary embodiment, the vehicle awning 18 includes a fabric cover (not shown), a roller tube (not shown), a support frame (not shown), a drive system (not shown), and a vehicle awning light source 32. In a non-limiting example, the fabric cover is made of a weather-resistance material. A first end of the fabric cover is affixed to the roller tube, such that when rotated, the fabric cover is wrapped around the roller tube.

The roller tube is a cylindrical tube which holds the fabric cover when it is stowed. The roller tube is rotated by the drive system to deploy and retract the vehicle awning 18. The support frame is a mechanical assembly configured to structurally support the fabric cover when the vehicle awning 18 is deployed. In an exemplary embodiment, the support frame further includes additional support members affixed to the fabric cover which may be braced against the ground to provide additional mechanical support to the vehicle awning 18.

The drive system includes, for example, an electric motor coupled to the roller tube. In a non-limiting example, the drive system may further include one or more gears, belts, pulleys, levers, ropes, and/or other mechanical linkages between the electric motor and the roller tube. The electric motor is configured to extend the fabric cover by rotating the roller tube upon command (i.e., electrical communication) from the controller 14. The state of the vehicle awning 18 when the fabric cover is extended is referred to herein as a deployed state of the vehicle awning 18. The electric motor is further configured to retract the fabric cover by rotating the roller tube upon command (i.e., electrical communication) from the controller 14. The state of the vehicle awning 18 when the fabric cover is retracted is referred to herein as a stowed state of the vehicle awning 18.

The vehicle awning light source 32 is an electrical device configured to emit light. In a non-limiting example, the vehicle awning light source 32 includes one or more light emitting diodes (LEDs) affixed to an underside of the fabric cover. Therefore, when the vehicle awning 18 is deployed, the vehicle awning light source 32 may be used to illuminate the environment surrounding the vehicle 12. It should be understood that various additional light sources, such as, for example, electroluminescent wire, LED matrix displays, incandescent light sources, fluorescent light sources, and the like, are within the scope of the present disclosure.

In an exemplary embodiment, the vehicle awning 18 is integrated into a roof of the vehicle 12 and configured to deploy over at least one door of the vehicle 12, such that a coverage area of the vehicle awning 18 (i.e., an area under the vehicle awning 18 which is protected from environmental conditions) includes an area immediately adjacent to the at least one door of the vehicle 12. In another exemplary embodiment, the vehicle awning 18 is a self-contained unit which is affixed to a roof rack of the vehicle 12. In yet another exemplary embodiment, the vehicle awning 18 is affixed to the vehicle 12 such that the coverage area of the vehicle awning 18 includes an area immediately adjacent to a cargo compartment (e.g., a trunk, a frunk, a truck bed, and/or the like) of the vehicle 12.

It should be understood that various additional retractable environmental protection devices, including, for example, tonneau covers, sunshades, and the like are also within the scope of the present disclosure.

Figure 2:
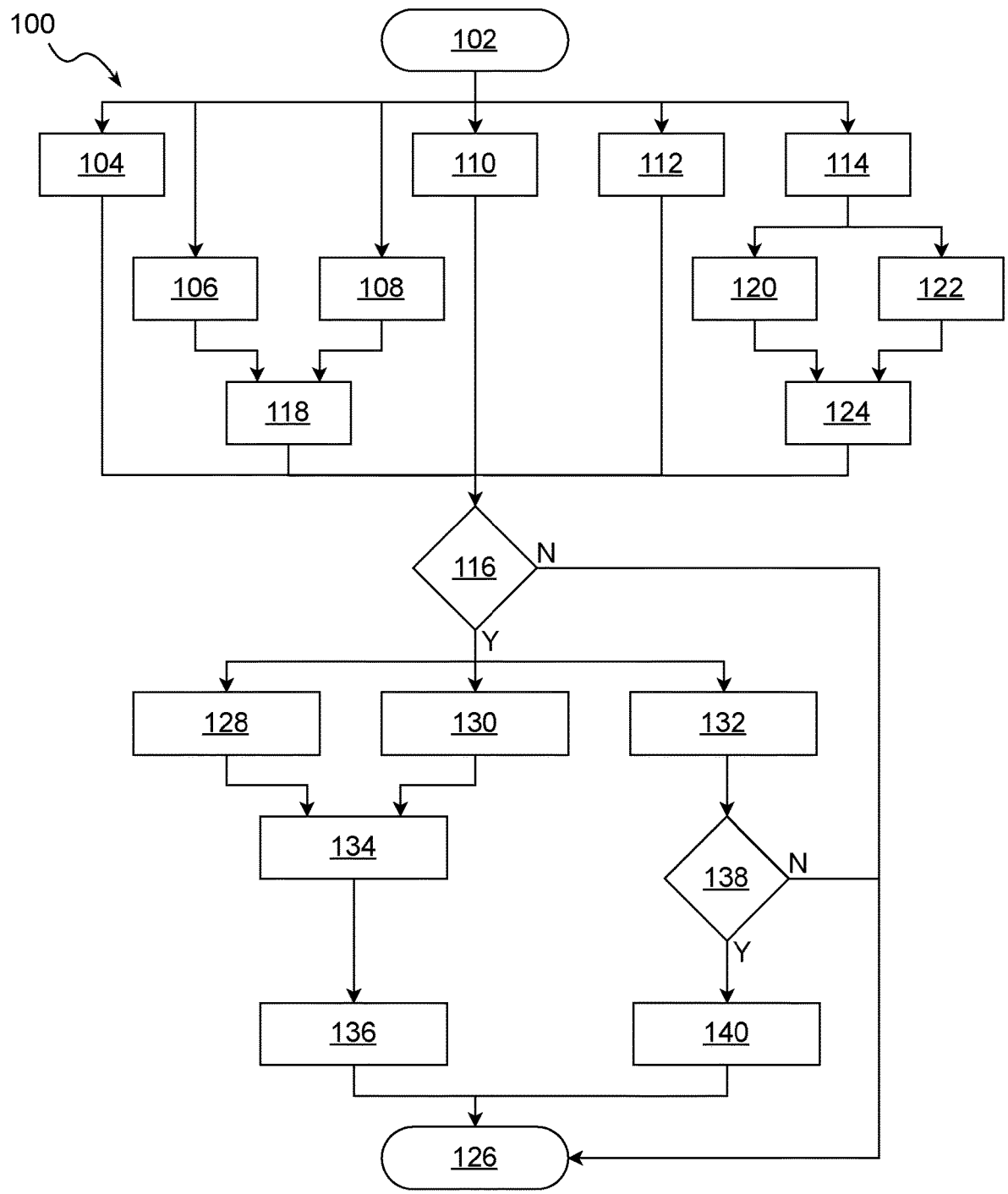
FIG. 2 is a flowchart of a method for deploying a vehicle awning, according to an exemplary embodiment.

Referring to FIG. 2, a flowchart of the method 100 for deploying a vehicle awning is shown. The method 100 begins at block 102 and proceeds to blocks 104, 106, 108, 110, 112, and 114. At block 104, the controller 14 determines a weather condition in the environment surrounding the vehicle. In an exemplary embodiment, the weather condition includes information about precipitation, sun load, and wind conditions. In the scope of the present disclosure, a precipitation condition is defined as weather including precipitation (e.g., rain, sleet, snow, hail, and/or the like). A high sun load condition is defined as weather including solar radiation exceeding a predetermined solar radiation threshold (e.g., four hundred watts per square meter). A high wind condition is defined as weather including winds exceeding a predetermined wind speed threshold (e.g., eight meters per second).

In an exemplary embodiment, the weather condition is determined using the vehicle communication system 26. In a non-limiting example, the controller 14 first determines a location of the vehicle 12 using the GNSS 24. The controller 14 then uses the vehicle communication system 26 to establish a connection with a remote server containing weather information. The controller 14 transmits the location of the vehicle 12 to the remote server and receives weather condition information about the environment surrounding the vehicle from the remote server. In another exemplary embodiment, the weather condition is determined using one of more of the plurality of vehicle sensors 16. In a non-limiting example, the precipitation information is determined using a rain sensor of the plurality of vehicle sensors 16. The sun load information is determined using a sun load sensor of the plurality of vehicle sensors 16. After block 104, the method 100 proceeds to block 116, as will be discussed in greater detail below.

At block 106, the controller 14 determines a location of the vehicle 12 using the GNSS 24. After block 106, the method 100 proceeds to block 118, as will be discussed in greater detail below.

At block 108, the controller 14 determines a gear selector state of a gear selector of the vehicle 12. In the scope of the present disclosure, the gear selector is a human-interface device (HID) used by the occupant to control a transmission and/or drivetrain of the vehicle 12. For example, the gear selector may include a plurality of electromechanical switches allowing the occupant to switch between a parking selected state (i.e., a state wherein the drivetrain of the vehicle is configured to prevent movement of the vehicle 12, for example, by engaging a parking pawl of the transmission of the vehicle 12) and a non-parking selected state (i.e., a state wherein the drivetrain of the vehicle 12 is configured to allow movement of the vehicle 12, for example, a "drive" gear of the gear selector). It should be understood that the parking selected state and the non-parking selected state may be selected by the occupant using a plurality of human-machine interfaces, including, for example, a multi-throw electromechanical switch, a touchscreen, and the like without departing from the scope of the present disclosure. After block 108, the method 100 proceeds to block 118, as will be discussed in greater detail below.

At block 118, the controller 14 determines a vehicle parking state. In the scope of the present disclosure, the vehicle parking state includes a vehicle parked state or a vehicle non-parked state. In an exemplary embodiment, the vehicle parking state is determined based at least in part on the location of the vehicle determined at block 106 and the gear selector state determined at block 108. In a non-limiting example, if the location of the vehicle 12 is determined to be a parking area (e.g., a parking lot, a parking garage, a driveway of a residence, or the like) and the gear selector state is the parking selected state, the vehicle parking state is determined to be the vehicle parked state. In another non-limiting example, if the location of the vehicle 12 is determined to be a non-parking area (e.g., a roadway) and the gear selector state is the parking selected state, the vehicle parking state is determined to be the vehicle non-parked state. In yet another non-limiting example, if the gear selector state is the non-parking selected state, the vehicle parking state is determined to be the vehicle non-parked state, regardless of the location of the vehicle 12. After block 118, the method 100 proceeds to block 116, as will be discussed in greater detail below.

At block 110, the controller 14 determines an occupant location relative to the vehicle 12. In an exemplary embodiment, the occupant location relative to the vehicle 12 is determined using the plurality of vehicle sensors 16. In a non-limiting example, the controller 14 uses the vehicle communication system 26 to establish a connection with a mobile device of the occupant. The mobile device of the occupant determines a location of the occupant and transmits the location of the occupant to the controller 14 using the vehicle communication system 26. In another non-limiting example, the controller 14 communicates with occupancy sensors of the plurality of vehicle sensors 16 (e.g., seat occupancy sensors) to determine whether the occupant is in the vehicle 12. In yet another non-limiting example, the controller 14 uses the perception sensor (e.g., the surround view camera system 28) of the plurality of vehicle sensors 16 to detect the occupant in the environment surrounding the vehicle 12 and determine the location of the occupant relative to the vehicle 12. After block 110, the method 100 proceeds to block 116, as will be discussed in greater detail below.

At block 112, the controller 14 receives a deployment signal using the vehicle communication system 26. In the scope of the present disclosure, the deployment signal is a signal transmitted by a device of the occupant (e.g., a key fob, a mobile device, a wearable device, and the like) requesting that the vehicle awning 18 be deployed. In another exemplary embodiment, the deployment signal includes voice commands provided by the occupant and recognized by a voice recognition system of the vehicle 12. In yet another exemplary embodiment, the deployment signal includes an electromechanical button or a touchscreen interface button which is actuated by the occupant. After block 112, the method 100 proceeds to block 116, as will be discussed in greater detail below.

At block 114, the controller 14 uses the perception sensor of the plurality of vehicle sensors 16 to perform at least one perception measurement. In an exemplary embodiment, the controller 14 uses the surround view camera system 28 to capture at least one image of the environment surrounding the vehicle 12. After block 114, the method 100 proceeds to blocks 120 and 122.

At block 120, the controller 14 determines a predicted path of an occupant approaching the vehicle 12. In an exemplary embodiment, the predicted path is determined based at least in part on the at least one perception measurement performed at block 114. In a non-limiting example, the controller 14 uses a machine learning algorithm, for example, a neural network. In a non-limiting example, the machine learning algorithm is trained by providing the algorithm with a plurality of perception measurements (e.g., images) of occupants approaching vehicles. For example, the plurality of perception measurements may include occupants approaching vehicles in a variety of environmental conditions from a variety of angles. After sufficient training of the machine learning algorithm, the algorithm can predict a path of an occupant approaching a vehicle with a high accuracy and precision.

In another exemplary embodiment, the controller 14 determines the predicted path of the occupant by first determining a position of the occupant relative to the vehicle 12 based on the at least one perception measurement. The controller 14 then predicts the path of the occupant to be a shortest path to a door of the vehicle 12 which is closest to the position of the occupant. After block 120, the method 100 proceeds to block 124, as will be discussed in greater detail below.

At block 122, the controller 14 identifies a cargo load of the occupant. In the scope of the present disclosure, the cargo load includes any items that the occupant is carrying to the vehicle (e.g., luggage, shopping bags, sports equipment, strollers, and the like). In an exemplary embodiment, the cargo load of the occupant is identified based at least in part on the at least one perception measurement performed at block 114. In a non-limiting example, the controller 14 uses a machine learning algorithm to identify the cargo load of the occupant. In a non-limiting example, the machine learning algorithm is trained by providing the algorithm with a plurality of perception measurements (e.g., images) of occupants carrying various cargo loads. For example, the plurality of perception measurements may include occupants carrying boxes and bags of various sizes in various environment conditions. After sufficient training of the machine learning algorithm, the algorithm can predict a cargo load of the occupant with a high accuracy and precision. In another exemplary embodiment, computer vision is used to identify the cargo load of the occupant. After block 122, the method 100 proceeds to block 124.

At block 124, the controller 14 determines a predicted door utilization. In the scope of the present disclosure, the predicted door utilization includes one or more doors of the vehicle 12 which are predicted to be used by an occupant approaching the vehicle 12 or an occupant exiting the vehicle 12. In an exemplary embodiment, the predicted door utilization is determined based at least in part on the predicted path of the occupant determined at block 120 and the cargo load of the occupant determined at block 122. In a non-limiting example, if a single occupant is approaching the vehicle 12 with no cargo, the predicted door utilization is a driver's door of the vehicle. In another non-limiting example, if a single occupant is approaching the vehicle 12 with cargo (e.g., a stroller), the predicted door utilization includes a cargo door of the vehicle 12 (e.g., a trunk of the vehicle 12) and the driver's door of the vehicle 12. In another non-limiting example, if multiple occupants are approaching the vehicle 12 with cargo (e.g., a stroller), the predicted door utilization includes a cargo door of the vehicle 12 (e.g., a trunk of the vehicle 12), the driver's door of the vehicle 12, and additional passenger doors of the vehicle 12, depending on the predicted paths of the occupants.

In an exemplary embodiment, the predicted door utilization is determined using a multidimensional lookup table (LUT) which maps the predicted path of the occupant determined at block 120 and the cargo load of the occupant determined at block 122 to the predicted door utilization. The LUT has two key columns (i.e., one key column for each of the predicted path of the occupant and the cargo load of the occupant) and one value column (i.e., one value column for the predicted door utilization). In an exemplary embodiment, the LUT includes a plurality of rows, each of the plurality of rows mapping a unique combination of the predicted path and cargo load in the two key columns to a value in the value column (i.e., a plurality of doors of the vehicle 12). The LUT is stored in the media 22 of the controller 14. In an exemplary embodiment, the plurality of rows of the LUT are predetermined. In another exemplary embodiment, the plurality of rows of the LUT may be modified by the occupant, using, for example, a human-interface device. In yet another exemplary embodiment, the plurality of rows of the LUT may be updated over-the-air (OTA) using the vehicle communication system 26. It should be understood that any method (e.g., programmatic data structure, logic equation, mathematical function, and/or the like) of mapping a plurality of keys (i.e., the predicted path and the cargo load) to a plurality of values (i.e., the predicted door utilization) is within the scope of the present disclosure.

In another exemplary embodiment, the controller 14 uses a machine learning algorithm to determine the predicted door utilization. In a non-limiting example, the machine learning algorithm is trained by providing the algorithm with a plurality of occupant paths and cargo loads. For example, the plurality of occupant paths may include path data for various numbers of occupants approaching the vehicle 12 from various angles. Each of the plurality of paths is classified with a cargo load. After sufficient training of the machine learning algorithm, the algorithm can predict door utilization with a high accuracy and precision. After block 124, the method 100 proceeds to block 116.

At block 116, the controller 14 identifies at least one deployment criterion based at least in part on the results of blocks 104, 110, 112, 118, and 124. In an exemplary embodiment, the at least one deployment criterion is identified based on the weather condition determined at block 104, the occupant location determined at block 110, the deployment signal received at block 112, the vehicle parking state determined at block 118, and the predicted door utilization determined at block 124. In a non-limiting example, the at least one deployment criterion is identified if the weather condition (as determined at block 104) is the precipitation condition, the occupant location (as determined at block 110) is within a predetermined proximity threshold (e.g., five meters) of the vehicle 12, and the vehicle parking state (as determined at block 118) is the vehicle parked state.

In another non-limiting example, the at least one deployment criterion is identified if the deployment signal is received block 112 and the vehicle parking state (as determined at block 118) is the vehicle parked state. In another non-limiting example, the at least one deployment criterion is identified if the coverage area of the vehicle awning 18 includes at least one door of the predicted door utilization determined at block 124, the weather condition (as determined at block 104) is the precipitation condition, the occupant location (as determined at block 110) is within a predetermined proximity threshold (e.g., five meters) of the vehicle 12, and the vehicle parking state (as determined at block 118) is the vehicle parked state. In an exemplary embodiment, the at least one deployment criterion is identified based on the results of blocks 104, 110, 112, 118, and 124 using a LUT, a programmatic data structure, a logic equation, a mathematical function, and/or the like. If at least one deployment criterion is not identified at block 116, the method 100 proceeds to enter a standby state at block 126. If at least one deployment criterion is identified at block 116, the method 100 proceeds to blocks 128, 130, and 132.

Figure 3:
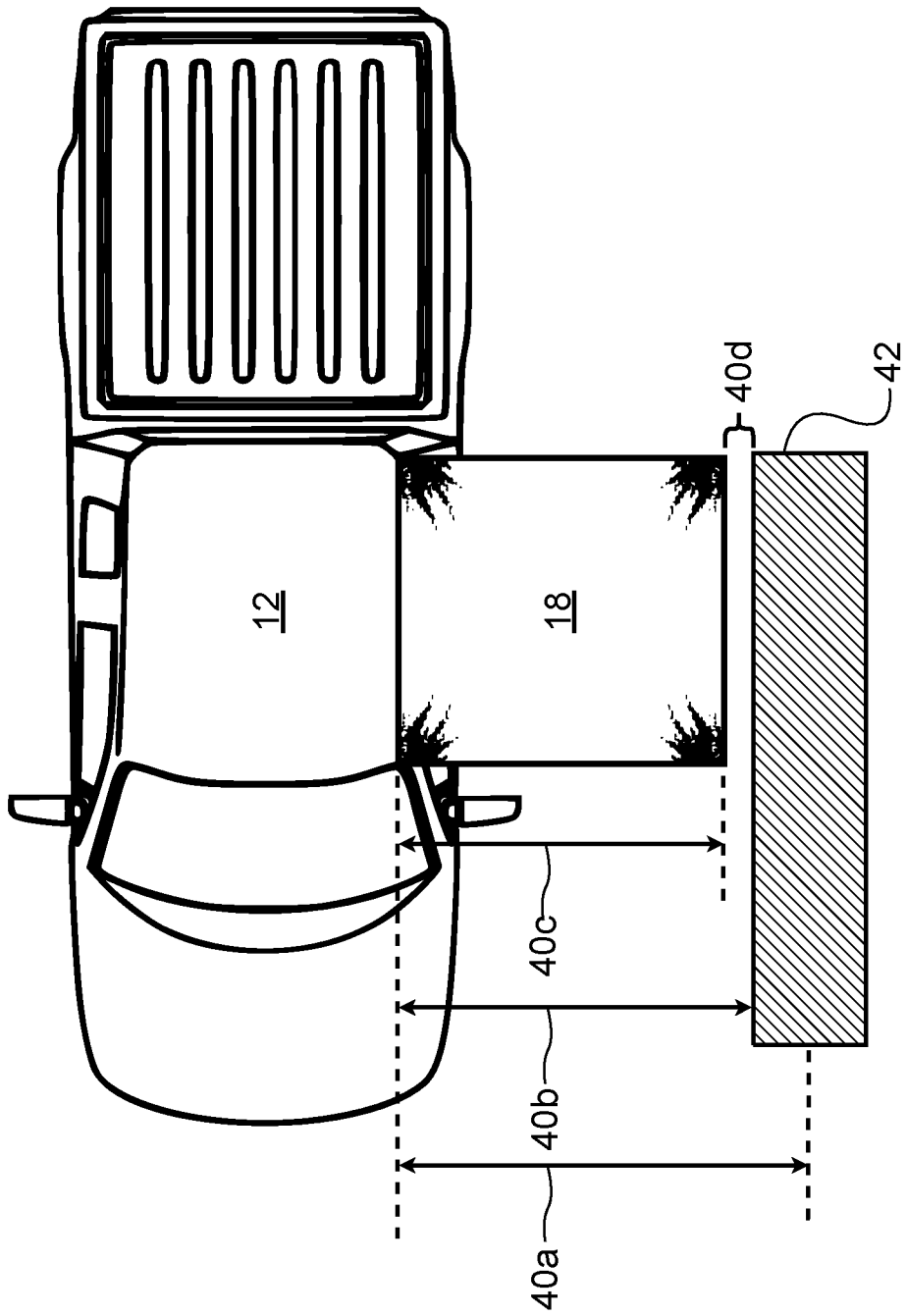
FIG. 3 is a schematic diagram of a vehicle including a vehicle awning in a deployed state, according to an exemplary embodiment.

Referring to FIG. 3, a schematic diagram of the vehicle 12 with the vehicle awning 18 in the deployed state is shown. In FIG. 3, the vehicle awning 18 is shown to be affixed to a driver's side of the vehicle 12. It should be understood, however, that the vehicle awning 18 may be affixed to any side of the vehicle 12 (e.g., a passenger side of the vehicle 12) without departing from the scope of the present disclosure. Furthermore, the system 10 and method 100 may be used to control multiple vehicle awnings 18 affixed at various locations in and/or on the vehicle 12 without departing from the scope of the present disclosure.

Referring again to FIG. 2, with continued reference to FIG. 3, at block 128, the controller 14 determines a desired awning deployment distance 40a. In an exemplary embodiment, the desired awning deployment distance 40a is determined based at least in part on the at least one deployment criterion identified at block 116. In a non-limiting example, if an occupant is approaching the vehicle 12 with no cargo load, the desired awning deployment distance 40a is relatively small (e.g., 0.5 meters). In another non-limiting example, if an occupant approaching the vehicle 12 has a large stroller, the desired awning deployment distance 40a is relatively larger (e.g., 1.5 meters). In an exemplary embodiment, the desired awning deployment distance 40a is determined based on the at least one deployment criterion determined at block 116 using a LUT, a programmatic data structure, a logic equation, a mathematical function, and/or the like. After block 128, the method 100 proceeds to block 134, as will be discussed in greater detail below.

At block 130, the controller 14 determined a maximum awning deployment distance 40b. In the scope of the present disclosure, the maximum awning deployment distance 40b is a distance between the vehicle awning 18 and an obstacle 42 (e.g., another vehicle, a pedestrian, a structure, and/or the like) in the environment surrounding the vehicle 12. In an exemplary embodiment, to determine the maximum awning deployment distance 40b, the controller 14 uses the ranging sensor of the plurality of vehicle sensors 16 (e.g., the ultrasonic ranging sensor 30) to perform a distance measurement between the vehicle awning 18 and the obstacle 42 in the environment surrounding the vehicle 12. After block 130, the method 100 proceeds to block 134.

At block 134, the controller 14 determines an awning deployment distance 40c based at least in part on the desired awning deployment distance determined at block 128 and the maximum awning deployment distance determined at block 130. In an exemplary embodiment, the awning deployment distance 40c is equal to a lesser of the desired awning deployment distance 40a and the maximum awning deployment distance 40b. Therefore, the vehicle awning 18 will not impact the obstacle 42 during deployment. In another exemplary embodiment, the awning deployment distance 40c is equal to the lesser of the desired awning deployment distance 40a and the maximum awning deployment distance 40b minus a predetermined buffer distance 40d (e.g., ten centimeters), as depicted in FIG. 3. After block 134, the method 100 proceeds to block 136.

At block 136, the controller 14 deploys the vehicle awning 18 to the awning deployment distance 40c. In an exemplary embodiment, the controller 14 uses the drive system of the vehicle awning 18 to rotate the roller tube and extend the fabric cover of the vehicle awning 18. Therefore, after deployment of the vehicle awning 18, an edge of the fabric cover furthest from the vehicle 12 is positioned at the awning deployment distance 40c from the location of the vehicle awning 18 in the stowed state, as depicted in FIG. 3. After block 136, the method 100 proceeds to enter a standby state at block 126.

At block 132, the controller 14 determines a light level of the environment surrounding the vehicle 12 using the plurality of vehicle sensors 16. In an exemplary embodiment, the controller 14 determines the light level using a light sensor and/or sun load sensor of the plurality of vehicle sensors 16. In another exemplary embodiment, the light level is determined using the vehicle communication system 26. In a non-limiting example, the controller 14 first determines a location of the vehicle 12 using the GNSS 24. The controller 14 then uses the vehicle communication system 26 to establish a connection with a remote server containing weather information. The controller 14 transmits the location of the vehicle 12 to the remote server and receives light level information about the environment surrounding the vehicle from the remote server. After block 132, the method 100 proceeds to block 138.

At block 138, the controller 14 compares the light level determined at block 132 to a predetermined light level threshold (e.g., fifty lux). If the light level determined at block 132 is greater than the predetermined light level threshold, the method 100 proceeds to enter the standby state at block 126. If the light level determined at block 132 is less than or equal to the predetermined light level threshold, a vehicle awning light source activation state is determined to be a light source active state, and the method 100 proceeds block 140.

At block 140, the controller 14 enables the vehicle awning light source 32 in response to determining that the vehicle awning light source activation state is the light source active state. After block 140, the method 100 proceeds to enter the standby state at block 126.

In an exemplary embodiment, the controller 14 repeatedly exits the standby state 126 and restarts the method 100 at block 102. In a non-limiting example, the controller 14 exits the standby state 126 and restarts the method 100 on a timer, for example, every three hundred milliseconds.

The system 10 and method 100 of the present disclosure offer several advantages. The system 10 may be used to increase occupant comfort when entering and exiting the vehicle, and for entertainment (e.g., camping). Using the system 10 and method 100, the vehicle awning 18 is dynamically deployed based on environmental conditions, situational conditions, and predicted door use. By identifying cargo which the occupant is bringing to the vehicle 12, the awning deployment distance 40c is dynamically adjusted. Furthermore, the awning deployment distance 40c is adjusted based on obstacles in the environment surrounding the vehicle 12 (e.g., the obstacle 42). Additionally, the vehicle awning 18 may be installed onto a roof rack rail of the vehicle 12 as an aftermarket accessory or integrated into a roof design of the vehicle 12. Furthermore, the vehicle awning 18 may be configured to protect a front windshield of the vehicle 12 and/or a cargo area (e.g., truck bed, trunk) of the vehicle 12 from environmental conditions (e.g., sun, rain, and the like).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An awning system for a vehicle, the system comprising:
 a plurality of vehicle sensors;
 a vehicle awning;
 a controller in electrical communication with the plurality of vehicle sensors and the vehicle awning, wherein the controller is programmed to:
  identify at least one deployment criterion using the plurality of vehicle sensors, wherein to identify the at least one deployment criterion, the controller is further programmed to:
   determine a weather condition in an environment surrounding the vehicle using the plurality of vehicle sensors;
   determine an occupant location relative to the vehicle using the plurality of vehicle sensors;
   determine a vehicle parking state using the plurality of vehicle sensors, wherein the vehicle parking state includes a vehicle parked state and a vehicle non-parked state; and
   identify the at least one deployment criterion based at least in part on the weather condition, the occupant location, and the vehicle parking state;
  determine at least one deployment parameter based at least in part on the at least one deployment criterion; and
  deploy the vehicle awning based at least in part on the at least one deployment parameter in response to identifying the at least one deployment criterion.

2. The awning system of claim 1, wherein to identify the at least one deployment criterion, the controller is further programmed to:
 identify the at least one deployment criterion in response to determining that the weather condition is a precipitation condition, the occupant location is within a predetermined proximity threshold to the vehicle, and the vehicle parking state is the vehicle parked state.

3. The awning system of claim 1, wherein the plurality of vehicle sensors further includes a global navigation satellite system (GNSS), and wherein to determine the vehicle parking state, the controller is further programmed to:
 determine a location of the vehicle using the GNSS;
 determine a gear selector state of a gear selector of the vehicle, wherein the gear selector state includes a parking selected state and non-parking selected state; and
 determine the vehicle parking state based at least in part on the location of the vehicle and the gear selector state.

4. The awning system of claim 1, wherein the plurality of vehicle sensors further includes a vehicle communication system, and wherein to identify the at least one deployment criterion, the controller is further programmed to:
 receive a deployment signal using the vehicle communication system; and
 identify the at least one deployment criterion in response to receiving the deployment signal.

5. The awning system of claim 1, wherein to identify the at least one deployment criterion, the controller is further programmed to:
 determine a predicted door utilization of the vehicle using the plurality of vehicle sensors, wherein the predicted door utilization includes at least one door of the vehicle; and
 identify the at least one deployment criterion in response to determining that a coverage area of the vehicle awning includes at least one door of the predicted door utilization.

6. The awning system of claim 5, wherein the plurality of vehicle sensors further includes a perception sensor, and wherein to determine the predicted door utilization, the controller is further programmed to:
 perform at least one perception measurement using the perception sensor;
 determine a predicted path of an occupant approaching the vehicle based at least in part on the at least one perception measurement;
 identify a cargo load of the occupant based at least in part on the at least one perception measurement; and
 determine the predicted door utilization based at least in part on the predicted path and the cargo load.

7. The awning system of claim 1, wherein the plurality of vehicle sensors further includes a ranging sensor, and wherein to determine the at least one deployment parameter, the controller is further programmed to:
 determine a desired awning deployment distance based at least in part on the at least one deployment criterion;
 determine a maximum awning deployment distance, wherein determining the maximum awning deployment distance includes performing a distance measurement between the vehicle awning and an obstacle in an environment surrounding the vehicle using the ranging sensor; and
 determine an awning deployment distance based on the desired awning deployment distance and the maximum awning deployment distance, wherein the awning deployment distance is equal to a lesser of the desired awning deployment distance and the maximum awning deployment distance.

8. The awning system of claim 7, wherein to determine the at least one deployment parameter, the controller is further programmed to:
determine a light level of an environment surrounding the vehicle using the plurality of vehicle sensors;
compare the light level to a predetermined light level threshold; and
determine a vehicle awning light source activation state to be a light source active state in response to determining that the light level is less than or equal to the predetermined light level threshold.

9. The awning system of claim 8, wherein the vehicle awning further includes a vehicle awning light source, and wherein to deploy the vehicle awning, the controller is further programmed to:
deploy the vehicle awning to the awning deployment distance in response to identifying the at least one deployment criterion; and
enable the vehicle awning light source in response to determining that the vehicle awning light source activation state is the light source active state.

10. A method for deploying a vehicle awning, the method comprising:
identifying at least one deployment criterion using a controller and a plurality of vehicle sensors, wherein identifying the at least one deployment criterion further comprises:
performing at least one perception measurement using the controller and a perception sensor;
determining a predicted path of an occupant approaching the vehicle using the controller based at least in part on the at least one perception measurement;
identifying a cargo load of the occupant using the controller based at least in part on the at least one perception measurement;
determining a predicted door utilization of the vehicle using the controller based at least in part on the predicted path and the cargo load, wherein the predicted door utilization includes at least one door of the vehicle; and
identifying the at least one deployment criterion using the controller in response to determining that a coverage area of the vehicle awning includes at least one door of the predicted door utilization;
determining at least one deployment parameter using the controller based at least in part on the at least one deployment criterion; and
deploying the vehicle awning using the controller based at least in part on the at least one deployment parameter in response to identifying the at least one deployment criterion.

11. The method of claim 10, wherein identifying the at least one deployment criterion further comprises:
determining a weather condition in an environment surrounding the vehicle using the controller and the plurality of vehicle sensors;
determining an occupant location relative to the vehicle using the controller and the plurality of vehicle sensors;
determining a vehicle parking state using the controller and the plurality of vehicle sensors, wherein the vehicle parking state includes a vehicle parked state and a vehicle non-parked state; and
identifying the at least one deployment criterion using the controller in response to determining that the weather condition is a precipitation condition, the occupant location is within a predetermined proximity threshold to the vehicle, and the vehicle parking state is the vehicle parked state.

12. The method of claim 11, wherein determining the vehicle parking state further comprises:
determining a location of the vehicle using the controller and a global navigation satellite system (GNSS);
determining a gear selector state of a gear selector of the vehicle using the controller, wherein the gear selector state includes a parking selected state and non-parking selected state; and
determining the vehicle parking state using the controller based at least in part on the location of the vehicle and the gear selector state.

13. The method of claim 10, wherein identifying the at least one deployment criterion further comprises:
receiving a deployment signal using the controller and a vehicle communication system; and
identifying the at least one deployment criterion using the controller in response to receiving the deployment signal.

14. The method of claim 10, wherein determining the at least one deployment parameter further comprises:
determining a desired awning deployment distance using the controller based at least in part on the at least one deployment criterion;
determining a maximum awning deployment distance using the controller, wherein determining the maximum awning deployment distance includes performing a distance measurement between the vehicle awning and an obstacle in an environment surrounding the vehicle using the controller and a ranging sensor; and
determining an awning deployment distance using the controller based on the desired awning deployment distance and the maximum awning deployment distance, wherein the awning deployment distance is equal to a lesser of the desired awning deployment distance and the maximum awning deployment distance.

15. The method of claim 14, wherein deploying the vehicle awning further comprises:
deploying the vehicle awning to the awning deployment distance using the controller in response to identifying the at least one deployment criterion.

16. An awning system for a vehicle, the awning system comprising:
at least one vehicle sensor, the at least one vehicle sensor comprising:
a global navigation satellite system (GNSS);
a vehicle communication system;
a perception sensor; and
a ranging sensor;
a vehicle awning, the vehicle awning comprising:
a vehicle awning light source; and
a controller in electrical communication with the at least one vehicle sensor and the vehicle awning, wherein the controller is programmed to:
determine a weather condition in an environment surrounding the vehicle using the at least one vehicle sensor;
determine an occupant location relative to the vehicle using the at least one vehicle sensor;
determine a location of the vehicle using the GNSS;
determine a gear selector state of a gear selector of the vehicle, wherein the gear selector state includes a parking selected state and non-parking selected state;

determine a vehicle parking state based at least in part on the location of the vehicle and the gear selector state;

identify at least one deployment criterion in response to determining that the weather condition is a precipitation condition, the occupant location is within a predetermined proximity threshold to the vehicle, and the vehicle parking state is the vehicle parked state;

perform at least one perception measurement using the perception sensor;

determine a predicted path of an occupant approaching the vehicle based at least in part on the at least one perception measurement;

identify a cargo load of the occupant based at least in part on the at least one perception measurement;

determine a predicted door utilization based at least in part on the predicted path and the cargo load; and deploy the vehicle awning based at least in part on the predicted door utilization.

17. The awning system of claim 16, wherein the controller is further programmed to:

determine a desired awning deployment distance based at least in part on the at least one deployment criterion;

determine a maximum awning deployment distance, wherein determining the maximum awning deployment distance includes performing a distance measurement between the vehicle awning and an obstacle in an environment surrounding the vehicle using the ranging sensor;

determine an awning deployment distance based on the desired awning deployment distance and the maximum awning deployment distance, wherein the awning deployment distance is equal to a lesser of the desired awning deployment distance and the maximum awning deployment distance; and deploy the vehicle awning based at least in part on the predicted door utilization and the awning deployment distance.

18. The awning system of claim 17, wherein the controller is further programmed to:

determine a light level of an environment surrounding the vehicle using the at least one vehicle sensor;

compare the light level to a predetermined light level threshold; and enable the vehicle awning light source in response to determining that the light level is less than or equal to the predetermined light level threshold.

* * * * *